US008942310B2

(12) United States Patent
Miyatani et al.

(10) Patent No.: US 8,942,310 B2
(45) Date of Patent: Jan. 27, 2015

(54) INFORMATION PROCESSING APPARATUS AND INFORMATION PROCESSING METHOD, AND NON-TRANSITORY COMPUTER READABLE MEDIUM STORING INFORMATION PROCESSING PROGRAM

(75) Inventors: Tetsuhiko Miyatani, Tokyo (JP); Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 13/881,569

(22) PCT Filed: Nov. 29, 2011

(86) PCT No.: PCT/JP2011/006663
§ 371 (c)(1),
(2), (4) Date: Apr. 25, 2013

(87) PCT Pub. No.: WO2012/101703
PCT Pub. Date: Aug. 2, 2012

(65) Prior Publication Data
US 2013/0215989 A1    Aug. 22, 2013

(30) Foreign Application Priority Data
Jan. 27, 2011   (JP) .................................. 2011-014974

(51) Int. Cl.
H04L 27/00 (2006.01)
H04B 7/04 (2006.01)
H04B 7/06 (2006.01)

(52) U.S. Cl.
CPC ............ *H04B 7/0408* (2013.01); *H04B 7/0617* (2013.01); *H04B 7/0417* (2013.01); *H04B 7/0465* (2013.01)
USPC ............................ 375/295; 375/260; 375/296

(58) Field of Classification Search
USPC .................................. 375/219–220, 260, 285
See application file for complete search history.

(56) References Cited

U.S. PATENT DOCUMENTS

2003/0144032 A1   7/2003   Brunner et al.
2004/0082299 A1*  4/2004   Brunner et al. ............... 455/101
(Continued)

FOREIGN PATENT DOCUMENTS

| JP | 2004-501552 A | 1/2004 |
| JP | 2006-504341 A | 2/2006 |

(Continued)

OTHER PUBLICATIONS

Potevio, "PMI Feedback mechanism analysis of dual layer beamforming for TDD system", TSG-RAN WG1 Meeting #57bis, Jun. 29—Jul. 3, 2009, Los Angeles, CA, USA.
(Continued)

*Primary Examiner* — Vineeta Panwalkar
*Assistant Examiner* — Janice Tieu
(74) *Attorney, Agent, or Firm* — Sughrue Mion, PLLC

(57) ABSTRACT

Transmission channel estimation is performed for NT×NR reception signals and estimated transmission channel values are thereby output. The estimated transmission channel values are divided into N groups of NT×M estimated transmission channel values and a covariance matrix with M rows and N columns is obtained for each of the estimated transmission channel value groups. The N covariance matrixes are averaged over a predetermined range in terms of at least a time or a frequency (first averaging). Eigenvectors are generated based on respective N averaging outputs. Transmission channels between base station antennas and terminal antennas are generated from the eigenvectors and the estimated transmission channel values. Covariance matrixes are obtained for the generated transmission channels. The covariance matrixes are averaged over a different range from the range used in the first averaging (second averaging) and a beam forming weight is obtained by combining the generated eigenvectors.

8 Claims, 5 Drawing Sheets

(56) References Cited

U.S. PATENT DOCUMENTS

| | | |
|---|---|---|
| 2004/0087324 A1 | 5/2004 | Ketchum et al. |
| 2006/0203794 A1 | 9/2006 | Sampath et al. |
| 2009/0067513 A1* | 3/2009 | Kim et al. .................... 375/260 |
| 2009/0322614 A1* | 12/2009 | Na et al. ........................ 342/377 |

FOREIGN PATENT DOCUMENTS

| | | |
|---|---|---|
| JP | 2006-67623 A | 3/2006 |
| JP | 2008-533869 A | 8/2008 |
| JP | 2011-47865 A | 3/2011 |
| WO | 2010/079748 A1 | 7/2010 |

OTHER PUBLICATIONS

International Search Report of PCT/JP2011/006663 dated Jan. 10, 2012.

* cited by examiner

US 8,942,310 B2

INFORMATION PROCESSING APPARATUS AND INFORMATION PROCESSING METHOD, AND NON-TRANSITORY COMPUTER READABLE MEDIUM STORING INFORMATION PROCESSING PROGRAM

CROSS REFERENCE TO RELATED APPLICATIONS

This is a National Stage of International Application No. PCT/JP2011/006663 filed Nov. 29, 2011, claiming priority based on Japanese Patent Application No. 2011-014974 filed Jan. 27, 2011, the contents of all of which are incorporated herein by reference in their entirety.

TECHNICAL FIELD

The present invention relates to a radio communication technique using a plurality of antenna groups.

BACKGROUND ART

In TDD (Time Division Duplex) radio communication systems, there are ones that use an eigenvector(s) obtained by eigenvalue decomposition as a beam forming weight(s) in transmission/reception of a signal in order to improve the radio characteristics. Patent literatures 1 and 2 disclose a technique in which eigenvalue decomposition is performed on a reception signal of an uplink (communication line from a terminal station to a base station) and a transmission beam of a downlink (communication line from the base station to the terminal station) is formed by using its result.

Further, Non-patent literature 1 introduces a beam forming method in which attention is paid to the correlation-present property and the correlation-absent property of antennas. This literature shows an example of Grouped EBB (Eigenvalue-Based Beamforming: beam forming based on eigenvalue decomposition) under an assumption that, for provided antenna, a plurality of polarized antennas are arranged in a linear array.

CITATION LIST

Patent Literature

Patent literature 1: Published Japanese Translation of PCT International Publication for Patent Application, No. 2006-504341
Patent literature 2: Japanese Unexamined Patent Application Publication No. 2008-533869

Non-Patent Literature

Non-patent literature 1: 3GPP contributed article R1-092811 Potevio, "PMI Feedback mechanism analysis of dual layer beam-forming for TDD system"

SUMMARY OF INVENTION

Technical Problem

However, the antenna configuration in which a plurality of polarized antennas are arranged in a linear array has both of the correlation-present property and the correlation-absent property at the same time. Therefore, there are cases that cannot be coped with by the Global-EBB disclosed in Non-patent literature 1. Specifically, a problem tends to occur when the signal quality of the uplink (e.g., SNR: Signal power to Noise power Ratio, SIR: Signal power to Interference power Ratio, and/or SINR: Signal power to Interference plus Noise Power) is poor. In order to improve the signal quality, the averaging is performed over as long section as possible. However, there are cases in which the averaging results are cancelled out due to the correlation-absent property during that process and, as a result, the desired signal component(s) is attenuated. Consequently, the signal quality cannot be improved and thus the optimal transmission cannot be performed.

In the configuration of Grouped EBB+PMI (PMI: Precoding Matrix Indicator (an index indicating a weight selected by a terminal station) disclosed in Non-patent literature 1, the averaging processing can be divided into a correlation-present section and a correlation-absent section. However, it is based on the feedback (PMI) from a terminal station. Therefore, inconsistency from the transmission channel characteristic occurs in environments in which the measurement/feedback delay is large, and thus making it impossible to achieve the optimal performance. Further, in system environments in which PMI transmission is not assumed, it is impossible to perform control between correlation-absent antennas. Therefore, only average performance can be achieved.

An object of the present invention is to provide a technique capable of solving the above-described problem.

Solution to Problem

To achieve the above-described object, an apparatus according to the present invention is
an information processing apparatus including N antenna subsets (N is a natural number no less than two) each including M antennas (M is a natural number no less than two) and thereby including NR base station antennas in total (note that NR=M×N), further including:
a transmission channel estimation unit that performs transmission channel estimation for NT×NR reception signals (NT is a natural number no less than one) and thereby outputs NT×NR estimated transmission channel values, the NT×NR reception signals being output by NT terminal antennas of a user terminal and received by the base station antennas;
a first covariance matrix generation unit that divides the estimated transmission channel values into N groups of NT×M estimated transmission channel values and obtains a covariance matrix with M rows and N columns for each of the estimated transmission channel value groups;
a first averaging unit that averages each of the N covariance matrixes generated in the first covariance matrix generation unit over a predetermined range in terms of at least a time or a frequency;
a first eigenvector generation unit that generates eigenvectors or eigenvector equivalents based on respective N outputs from the first averaging unit;
a composite channel generation unit that generates transmission channels between the base station antennas and the terminal antennas from respective N eigenvectors or eigenvector equivalents and the estimated transmission channel values;
a second covariance matrix generation unit that obtains covariance matrixes for composite transmission channels generated by the composite channel generation unit;
a second averaging unit that averages covariance matrixes generated by the second covariance matrix generation unit over a different range from the range used in the first averaging unit;

a second eigenvector generation unit that outputs at least one eigenvector or eigenvector equivalent based on each of N outputs from the second averaging unit; and a combination unit that combines eigenvectors or eigenvector equivalents generated by the first and second eigenvector generation units and thereby obtains a beam forming weight.

To achieve the above-described object, a method according to the present invention includes:

a transmission channel estimation step of performing transmission channel estimation for reception signals received by NR base station antennas including N antenna subsets (N is a natural number no less than two) each including M antennas (M is a natural number no less than two) (note that NR=M×N), and thereby outputting estimated transmission channel values;

a first covariance matrix generation step of dividing the estimated transmission channel values into N groups and obtaining a covariance matrix with M rows and N columns for each of the estimated transmission channel value groups;

a first averaging step of averaging each of the generated covariance matrixes over a predetermined range in terms of at least a time or a frequency;

a first eigenvector generation step of generating eigenvectors or eigenvector equivalents based on respective N outputs obtained in the first averaging step;

a composite channel generation step of generating transmission channels between the base station antennas and terminal antennas from respective N eigenvectors or eigenvector equivalents and the estimated transmission channel values;

a second covariance matrix generation step of obtaining covariance matrixes for composite transmission channels generated in the composite channel generation step;

a second averaging step of averaging covariance matrixes generated in the second covariance matrix generation step over a different range from the range used in the first averaging step;

a second eigenvector generation step of outputting at least one eigenvector or eigenvector equivalent based on each of N average values derived in the second averaging step; and a combination step of combining eigenvectors or eigenvector equivalents generated in the first and second eigenvector generation steps and thereby obtains a beam forming weight.

To achieve the above-described object, a non-transitory computer readable medium storing a program according to the present invention stores a program that causes a computer to execute:

a transmission channel estimation step of performing transmission channel estimation for reception signals received by NR base station antennas including N antenna subsets (N is a natural number no less than two) each including M antennas (M is a natural number no less than two) (note that NR=M×N), and thereby outputting estimated transmission channel values;

a first covariance matrix generation step of dividing the estimated transmission channel values into N groups and obtaining a covariance matrix with M rows and N columns for each of the estimated transmission channel value groups;

a first averaging step of averaging each of the generated covariance matrixes over a predetermined range in terms of at least a time or a frequency;

a first eigenvector generation step of generating eigenvectors or eigenvector equivalents based on respective N outputs obtained in the first averaging step;

a composite channel generation step of generating transmission channels between the base station antennas and terminal antennas from respective N eigenvectors or eigenvector equivalents and the estimated transmission channel values;

a second covariance matrix generation step of obtaining covariance matrixes for composite transmission channels generated in the composite channel generation step;

a second averaging step of averaging covariance matrixes generated in the second covariance matrix generation step over a different range from the range used in the first averaging step;

a second eigenvector generation step of outputting at least one eigenvector or eigenvector equivalent based on each of N average values derived in the second averaging step; and a combination step of combining eigenvectors or eigenvector equivalents generated in the first and second eigenvector generation steps and thereby obtains a beam forming weight.

Advantageous Effects of Invention

According to the present invention, it is possible to form an optimal beam even when the quality of an estimated transmission channel value for the uplink is poor.

DESCRIPTION OF EMBODIMENTS

Exemplary embodiments according to the present invention are explained hereinafter in a detailed manner as examples with reference to the drawings. However, components described in the exemplary embodiments shown below are merely examples, and are not shown to limit the technical scope of the present invention to those embodiments.

First Exemplary Embodiment

Figure 1:
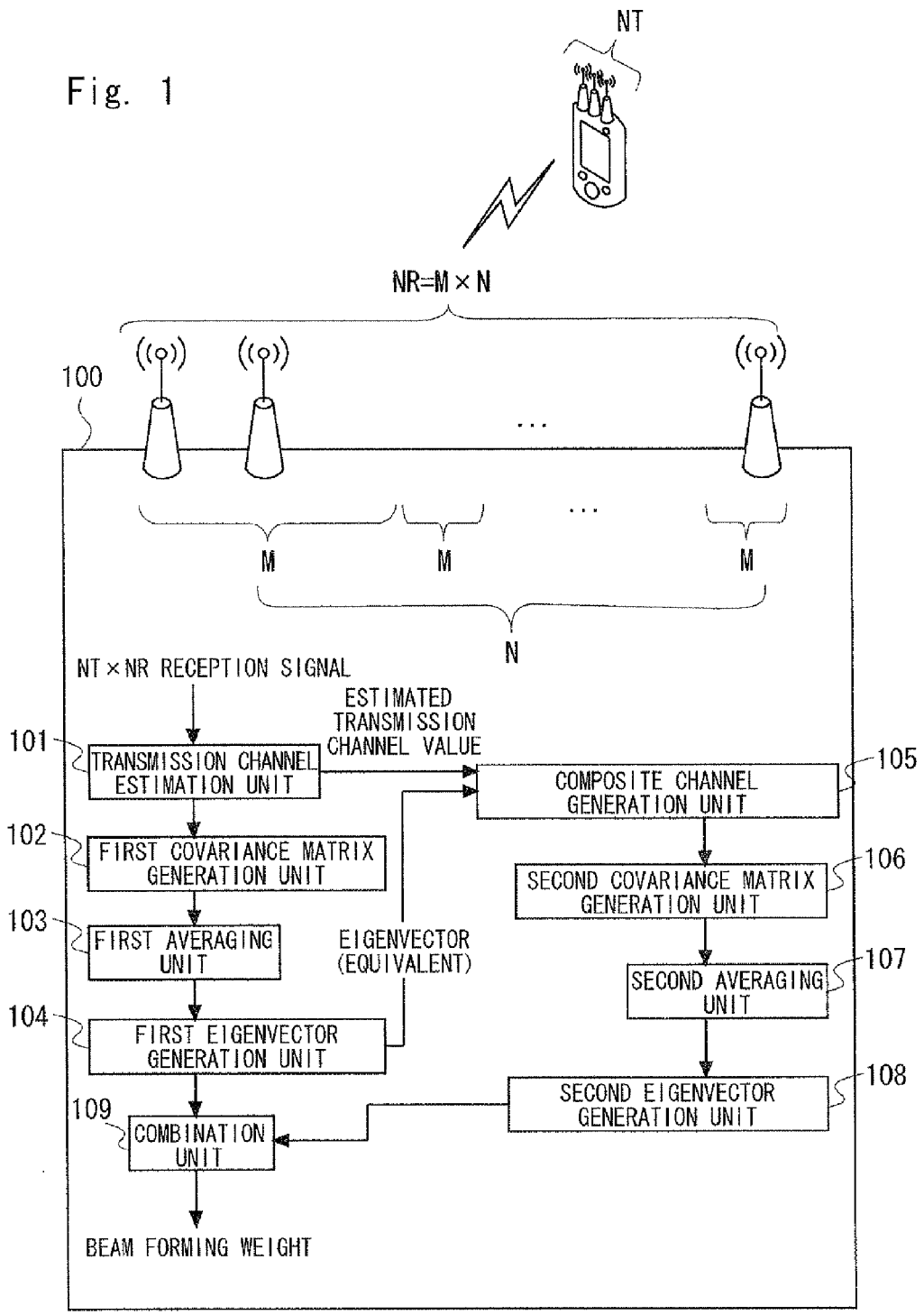
FIG. 1 is a block diagram showing a configuration of an information processing apparatus according to a first exemplary embodiment of the present invention.

An information processing apparatus 100 is explained as a first exemplary embodiment according to the present invention with reference to FIG. 1. The information processing apparatus 100 is an information processing apparatus including N antenna subsets (N is a natural number no less than two) each including M antennas (M is a natural number no less than two) and thereby including NR base station antennas in total (note that NR=M×N).

The information processing apparatus 100 includes a transmission channel estimation unit 101, a first covariance matrix generation unit 102, a first averaging unit 103, and a first eigenvector generation unit 104. Further, the information processing apparatus 100 also includes a composite channel generation unit 105, a second covariance matrix generation unit 106, a second averaging unit 107, a second eigenvector generation unit 108, and a combination unit 109.

The transmission channel estimation unit 101 performs transmission channel estimation for NT×NR reception signals (NT is a natural number no less than one) that are output by NT terminal antennas of a user terminal and received by the base station antennas, and thereby outputs NT×NR estimated transmission channel values.

The first covariance matrix generation unit 102 divides the estimated transmission channel values into N groups of NT×M estimated transmission channel values and obtains a covariance matrix with M rows and N columns for each of the estimated transmission channel value groups.

The first averaging unit 103 averages each of the N covariance matrixes generated by the covariance matrix generation unit 102 in terms of at least the time or the frequency.

The first eigenvector generation unit 104 outputs eigenvectors or eigenvector equivalents based on respective N outputs from the first averaging unit 103.

Meanwhile, the composite channel generation unit 105 generates transmission channels between the base station antennas and the terminal antennas from respective N eigenvectors or eigenvector equivalents and the estimated transmission channel values.

The second covariance matrix generation unit 106 obtains covariance matrixes for composite transmission channels generated by the composite channel generation unit 105.

The second averaging unit 107 averages covariance matrixes generated by the second covariance matrix generation unit 106 over a different range from the range used in the first averaging unit 107.

The second eigenvector generation unit 108 outputs at least one eigenvector or eigenvector equivalent based on each of N outputs from the second averaging unit 107.

The combination unit 109 combines eigenvectors or eigenvector equivalents generated by the first eigenvector generation unit 104 and the second eigenvector generation unit 108 and thereby obtains a beam forming weight(s).

According to this exemplary embodiment, it is possible to perform averaging for improving the signal quality of a beam forming weight(s). Further, excellent beam forming control can be implemented by preventing attenuation of a desired signal component(s) due to the averaging over a long section and by suppressing the transmission power fluctuations. As a result, it is possible to improve the reception signal quality.

Second Exemplary Embodiment

Figure 2:
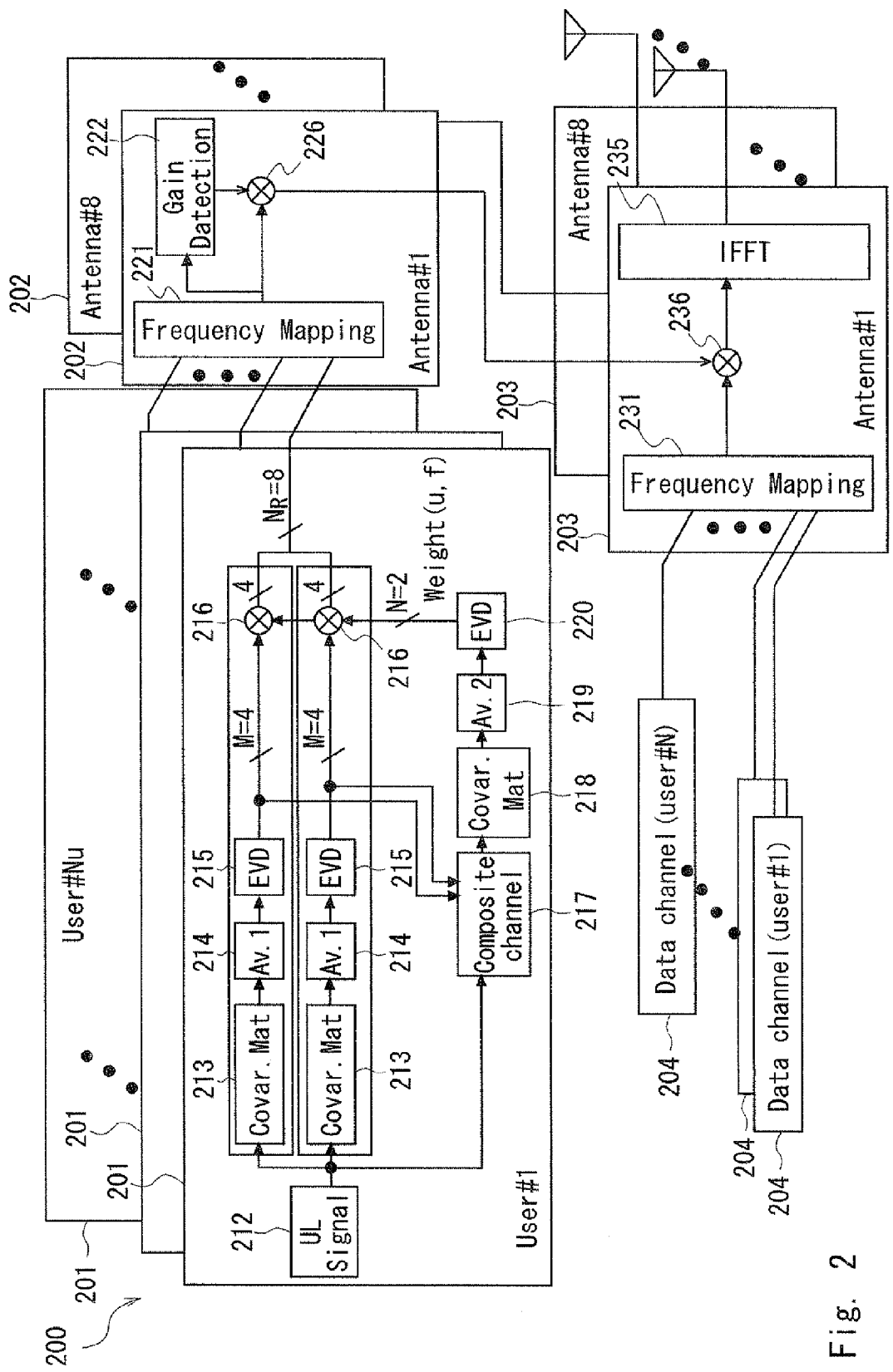
FIG. 2 is a block diagram showing a configuration of an information processing apparatus according to a second exemplary embodiment of the present invention.

An information processing apparatus 200 is explained as a second exemplary embodiment according to the present invention with reference to FIG. 2. The information processing apparatus 200 is an apparatus disposed in a base station including N antenna subsets (N is a natural number no less than two) each including M antennas (M is a natural number no less than two) and thereby including NR base station antennas in total (note that NR=M×N). The information processing apparatus 200 performs communication by using a TDD (Time Division Duplex) technique. A feature of this exemplary embodiment lies in the disclosure of an averaging technique and beam control between correlation-absent antennas, for the problem for coping with a low-quality signal in beam forming control performed on the condition that an antenna configuration has a correlation-present property and a correlation-absent property.

(Hardware Configuration)

As shown in FIG. 2, the information processing apparatus 200 includes a beam forming weight generation unit 201 for each user, a power adjustment unit 202 for each antenna, a modulation unit 203 for each antenna, and a data channel generation unit 204 for each user.

The beam forming weight generation unit 201 includes a transmission channel estimation unit (UL Signal) 212, a covariance matrix generation unit (Covar. Mat) 213, an averaging unit (AV.1) 214, an eigenvalue decomposition unit (EVD) 215, and a complex number multiplication unit 216. The covariance matrix generation unit 213, the averaging unit 214, and the eigenvalue decomposition unit 215 constitute a set of processes for the correlation present section. Therefore, the necessary number of these calculation units is equal to the number of imaginary correlation-absent antennas (i.e., two in FIG. 2). That is, the number of prepared units each of which is composed of the covariance matrix generation unit 213, the averaging unit 214, the eigenvalue decomposition unit 215, and the complex number multiplication unit 216 is equal to the number of imaginary correlation-absent antennas. In this exemplary embodiment, two units are provided.

Further, the beam forming weight generation unit 201 includes a composite channel calculation unit (Composite Channel) 217, a covariance matrix generation unit 218, an averaging unit 219, an eigenvalue decomposition unit 220. The composite channel calculation unit 217 receives eigenvectors each of which is obtained by using an average value for each antenna subset. The number of beam forming weight generation units 201 provided in the apparatus is equal to the number of users.

Further, the power adjustment unit 202 includes a frequency mapping unit (Frequency Mapping) 221, an excessive power detection unit (Gain Detection) 222, and a complex number multiplication unit 226.

Further, the modulation unit 203 includes a frequency mapping unit 221, an IFFT 235, and a complex number multiplication unit 236. Note that the transmission channel estimation unit 212 performs transmission channel estimation for NT×NR reception signals (NT is a natural number no less than one) that are output by NT terminal antennas of a user terminal and received by base station antennas, and thereby outputs NT×NR estimated transmission channel values.

The covariance matrix generation unit 213 divides the estimated transmission channel values output from the transmission channel estimation unit 212 into N groups of NT×M estimated transmission channel values and obtains a covariance matrix with M rows and N columns for each of the estimated transmission channel value groups.

The averaging unit 214 averages each of the N covariance matrixes generated by the covariance matrix generation unit 213 in terms of at least the time or the frequency.

The eigenvalue decomposition unit 215 performs eigenvalue decomposition for each of N outputs from the averaging unit 214 and thereby outputs N first eigenvectors each of which is composed of M elements.

The composite channel calculation unit 217 generates transmission channels between base station antennas and terminal antennas from respective N eigenvectors and the estimated transmission channel values.

The covariance matrix generation unit 218 obtains covariance matrixes for the composite transmission channels generated by the composite channel calculation unit 217.

The averaging unit 219 averages covariance matrixes generated by the second covariance matrix generation unit over a different range from the range used in the averaging unit 215.

The eigenvalue decomposition unit 220 performs eigenvalue decomposition for the output from the averaging unit 219 and thereby outputs at least one second eigenvector.

The complex number multiplication unit 216 performs a complex number multiplication of the first and second eigenvectors obtained in the eigenvalue decomposition units 215 and 220 and thereby obtains a beam forming weight(s).

(Operation)

Figure 4:
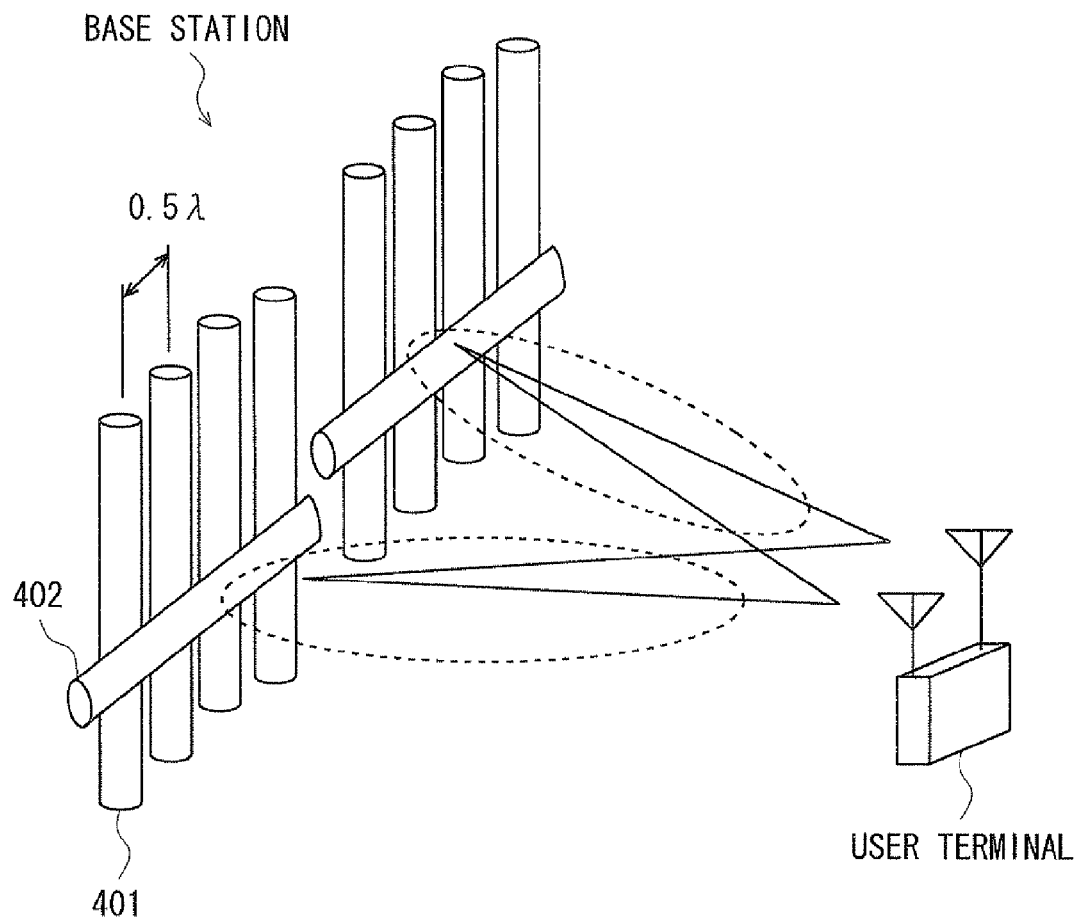
FIG. 4 shows an antenna configuration of an information processing apparatus according to a second exemplary embodiment of the present invention.

An operation of the information processing apparatus 200 in a case where an uplink signal is transmitted from a terminal to a base station and its transmission channel can be estimated is explained hereinafter. As shown in FIG. 4, an antenna configuration of a base station includes correlation-present antennas 401 (four, M=4) and imaginary correlation-absent antennas 402 (two, N=2, i.e., two antenna subsets) and thus M×N=8 in total in this exemplary embodiment. In FIG. 4, components 402 are supports that support antenna groups (=correlation-present subsets). In this example, four antennas constitute one subset and they are arranged at intervals of 0.5 wavelengths within each subset. The distance to the neighboring subset may be four wavelengths, 10 wavelengths, or the like. Assuming that they are polarized antennas, the subsets intersect each other and form a XXXX-shape. Note that the distance between X and X is 0.5 wavelengths. The angle between correlation-present groups is +45 degrees or −45 degrees. Note that although the correlation-present wavelength is set to 0.5 wavelengths, it may be 0.7 wavelengths.

In the beam forming weight generation unit 201, the transmission channel estimation unit 212 performs transmission channel estimation the number of times equal to the number of reception antennas by using uplink reception signals received in the base station. The results are supplied to the covariance matrix generation unit 213.

As N (=2) outputs of the eigenvalue decomposition unit 215, eigenvectors each composed of M (=4) elements (=eigenvectors corresponding to maximum eigenvalues that are obtained by rearranging eigenvalues in the descending order) are output and supplied to the composite channel calculation unit 217.

The composite channel calculation unit 217 receives N (=2) eigenvectors and also receives NR (=8) estimated transmission channel values from the transmission channel estimation unit 212. Upon receiving these inputs, the composite channel calculation unit forms a composite channel(s) composed of NT×N (=2×2 when the terminal performs two-antenna transmission, or 1×2 when the terminal performs one-antenna transmission) complex number matrixes and supplies the formed composite channel(s) to the covariance matrix generation unit 218. Note that this composite channel is an imaginary reception channel by a correlation-absent antenna(s) and is present, as a maximum quantity, over the system bandwidth.

The covariance matrix generation unit 218 calculates N×N (=2×2, and is not dependent on the number of terminal antennas) covariant matrixes for the input signals and supplies the calculated covariant matrixes to the averaging unit 219. The averaging unit 219 averages the covariant matrixes and supplies the averaged covariant matrix to the eigenvalue decomposition unit 220. The eigenvalue decomposition unit 220 performs eigenvalue decomposition. Note that since the inputs are N×N (=2×2), NT (=2) types of eigenvectors can be output at the maximum. The reason why the maximum number of elements is NT rather than N is that when NT=1, the number of ranks of N×N covariance matrixes becomes one. Therefore, even when the inputs are 2×2, only one type of effective eigenvector can be obtained.

The output of the eigenvalue decomposition unit 220 is dependent on the number of transmission antennas of the terminal, and becomes NT types of second eigenvectors each of which is composed of N (=2) elements. The second eigenvectors and the eigenvectors obtained from the eigenvalue decomposition unit 215 are multiplied in the complex number multiplication unit 216.

As a result, correlation-present channel vectors each composed of M (=4) elements are combined with correlation-absent channel vectors each composed of N (=2) elements. Consequently, weights corresponding to MR (=8) antennas in total are completed. Note that the dimension of beam forming weights in FIG. 2 is (MR (=8) antennas)×(System bandwidth). That is, although the output of the beam forming weight generation unit 201 for each user is indicated by one line in FIG. 2, the signals propagating therethrough is (MR (=8) antennas)×(System bandwidth). Strictly speaking, the system bandwidth is a number that is obtained by dividing the entire bandwidth by one bandwidth unit for the beam forming weight.

A beam forming weight(s) corresponding to the system bandwidth is supplied to the frequency mapping unit 221 for each antenna of the power adjustment unit 202. This process is performed the number of times (Nu) equal to the number of users for which a beam forming weight(s) should be created. That is, the number of the beam forming weight generation units 201 is Nu.

Each of the weight generation results is supplied to the frequency mapping unit 221 of the power adjustment unit 202 on an antenna-by-antenna basis. This frequency mapping unit 221 corresponds to the subcarrier mapping in the OFDM (Orthogonal Frequency Division Multiplexing). Which beam forming weight of which user occupies which frequency band is defined over the system band by the frequency mapping unit 221. The result is sent to the excessive power detection unit 222 and a gain(s) for correcting excessive power is obtained. By using this gain, the complex number multiplier (or, possibly, a multiplier) 226 performs a level adjustment(s).

The above explanation has been made for a system that generates a beam forming weight(s). Meanwhile, transmission data for each user is generated in the transmission data generation unit (in this example, including error-correcting encoding and other signal processing in accordance with various communication standards) 203.

The transmission data generation unit 203 includes a frequency mapping unit 231 and an IFFT (Inverse Fast Fourier Transform) unit 235. The frequency mapping unit 231 performs mapping of transmission data for each user onto a frequency domain. After that, a beam forming weight(s) is multiplied in the complex number multiplication unit 236 and then an OFDM modulation has been completed in the IFFT unit 235. By using this result, additional signal processing such as an addition of cyclic prefix and an up-conversion to a radio frequency is preformed and the transmission signal is emitted from each antenna.

(Comparison with Prerequisite Technique)

Figure 3:
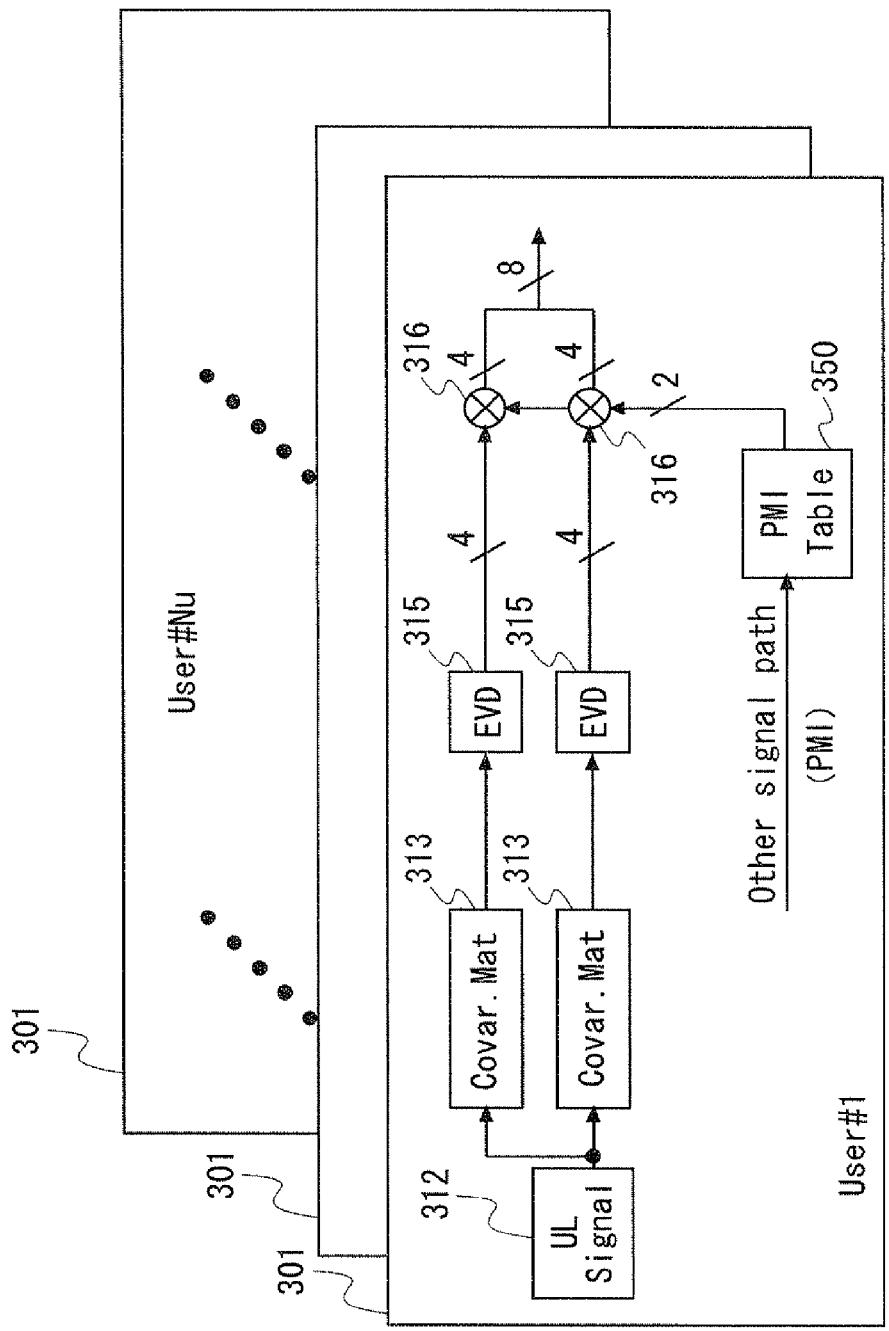
FIG. 3 is a block diagram for explaining a prerequisite technique of an information processing apparatus according to a second exemplary embodiment of the present invention.

FIG. 3 shows a configuration of a beam forming weight generation unit 301 as a prerequisite technique of this exemplary embodiment. As shown in FIG. 3, the beam forming weight generation unit 301 includes a transmission channel estimation unit (UL Signal) 312, a covariance matrix generation unit (Covar. Mat) 313, an eigenvalue decomposition unit (EVD) 315, and a complex number multiplication unit 316. The covariance matrix generation unit 313 and the eigenvalue decomposition unit 315 constitute a set of processes for the correlation present section. Therefore, the necessary number of these calculation units is equal to the number of imaginary correlation-absent antennas (i.e., two in this example). That is, the number of prepared units each of which is composed of the covariance matrix generation unit 313, the eigenvalue decomposition unit 315, and the complex number multiplication unit 316 is equal to the number of imaginary correlation-absent antennas.

Further, the beam forming weight generation unit 301 also includes a PMI (precoding matrix indicator) table 350. The PM I (precoding matrix indicator) indicates numbers assigned to beam forming weights which are already known between a terminal and a base station and are composed of a limited number of beam forming weights, and for which no amplitude control is performed. Therefore, if an optimal PMI can be fed back as a result of measurement in the terminal, an optimal beam can be formed even in the configuration shown in FIG. 3. However, for weights which are composed of a limited number of weights and for which no amplitude component exists, it is substantially impossible to expect the formation of an optimal beam.

In contrast to this, according to the configuration of this exemplary embodiment shown in FIG. 2, the presence of the averaging unit 214 can improve the reception transmission channel quality under an environment in which the quality of the uplink signal is low. Meanwhile, by performing eigenvalue decomposition for a composite channel(s) by using a series of blocks relating to the composite channel weight generation (217 to 220), an optimal beam weight(s) is also obtained for the composite channel(s). That is, the beam forming weight obtained by the eigenvalue decomposition becomes optimal transmission.

Further, in the averaging unit 219, it is possible to perform such a process that when the signal quality of the uplink signal is low, the averaging time constant is increased, whereas when the signal quality is high, the averaging time constant is decreased.

(Explanation Using Expressions)

Next, the above-described processing is described in a detailed manner by using expressions. Further, for the sake of easier understanding, the following explanation is made by using specific values used in the above explanation as examples.

Assume that transmission uplink signals corresponding to two transmission antennas in total can be received from a terminal station in a base station. As a result, a 2×8 complex number matrix is used for the uplink signal transmission channel estimation (in this example, the main purpose is to form a beam and the expansion of the frequency domain is not taken into consideration). This 2×8 complex number matrix is divided into correlation-present antenna sections. That is, the following expression is satisfied.

$$H_{2\times 8} = [H_A H_B] \quad \text{[Expression 1]}$$

In the expression, each of HA and HB is a 2×4 complex number matrix. That is, the original 2×8 transmission channel is separated into an antenna subset A and an antenna subset B.

For each of the antenna subsets, a covariance matrix is obtained and averaging is performed. Further, eigenvalue decomposition is preformed. As a result, eigenvectors VAP and VBP are obtained for the respective antenna subsets. Note that each eigenvector is a 4×1 complex number matrix. Note that there are various methods for the averaging. When an average over a long section in terms of the time is used, the averaging method should be selected according to the signal quality state. An example of a preferred embodiment is to perform simple addition averaging over the entire frequency band. Note that when a terminal station divides the entire bandwidth and performs uplink-signal transmission of the entire band over a long time, this averaging method also requires a separate examination (it is desirable to perform weighting averaging with consideration given to the moving speed of the terminal station).

Next, a composite channel Htmp is obtained in the following manner.

$$H_{tmp} = [H_A V_{AP} \; H_B V_{BP}] = \begin{bmatrix} h_{a0} & h_{b0} \\ h_{a1} & h_{b1} \end{bmatrix} \quad \text{[Expression 2]}$$

In the expression, hxy represents a composite transmission channel that is obtained from a terminal station antenna number y in an xth antenna subset. A covariance matrix R 2×2 is obtained for this composite transmission channel as shown below. In the following expression, * is an operator representing complex conjugate.

$$R_{2\times 2} = \begin{bmatrix} V_{AP}^H H_A^H \\ V_{BP}^H H_B^H \end{bmatrix} [H_A V_{AP} \; H_B V_{BP}]$$

$$= \begin{bmatrix} |h_{a0}|^2 + |h_{a1}|^2 & h_{a0}^* h_{b0} + h_{a1}^* h_{b1} \\ h_{a0} h_{b0}^* + h_{a1} h_{b1}^* & |h_{b0}|^2 + |h_{b1}|^2 \end{bmatrix} \quad \text{[Expression 3]}$$

Next, this covariance matrix is averaged. The averaging range is defined as a sub-band. That is, the entire system band is divided into a plurality of sub-bands, and a beam forming weight is calculated for each of the sub-bands. An example of the averaging is shown below. In the following expression, RBno is an RB (Resource Block) index that determines a frequency position within a sub-band.

$$\overline{R_{2\times 2}} = \frac{1}{SBsize} \sum_{RBno}^{SBsize} R_{2\times 2} \quad \text{[Expression 4]}$$

Next, eigenvalue decomposition is performed on this covariance matrix. The eigenvalue decomposition can be shown as shown below.

$$\overline{R_{2\times 2}} = V_2 D_2^2 V_2^H = \begin{bmatrix} v_{2(00)} & v_{2(01)} \\ v_{2(10)} & v_{2(11)} \end{bmatrix} D_2^2 V_2^H \quad \text{[Expression 5]}$$

In the expression, V2 represents a right singular vector of a 2×2 complex number matrix expression (or eigenvector); D2 represents a singular value matrix of a 2×2 real number diagonal matrix; and v2(xy) represents each element of the right singular vector (or eigenvector). In the above expression, assuming that a rearrangement in the descending order of the singular value (or eigenvalue) has been already finished, the row of the right singular vector (or eigenvector) represents a vector that is used to obtain a maximum power (=maximum eigenvalue) of a composite channel (composite transmission channel). That is, the row of the right singular vector (or eigenvector) represents an optimal weight in a composite channel.

As a result, the final beam forming weight V8×1 is obtained as shown below.

First layer: $V_{8\times 1,0} = [v_{2(00)} V_{AP} v_{2(10)} V_{BP}]^T$

Second layer: $V_{8\times 1,1} = [v_{2(01)} V_{AP} v_{2(11)} V_{BP}]^T$ [Expression 6]

In the expression, the first layer and the second layer correspond to ranks of the composite transmission channel and represent pre-coding weights in MIMO (Multiple Input Multiple Output) multiplex transmission or weights at the time of two-layer transmission with beam forming weights based on two-stream transmission. In the case of one-layer transmission, the weight for the first layer is used.

(Excessive Power Correction Processing)

Excessive power correction processing performed in the excessive power detection unit 222 is explained hereinafter. In general, transmission power per antenna is not ensured in signal transmission based on eigenvectors. That is, there are cases where the weight of some antenna(s) becomes zero and the entire power is concentrated in other antennas. In such cases, in general, a clipping function (=function of limiting the transmission amplitude to a fixed level when the transmission amplitude exceeds a certain level) is operated in the transmission unit disposed for each antenna in order to prevent the breakdown of the transmission power amplifier provided in each antenna. As a result, even though the breakdown of the transmission power amplifier is prevented, the signal quality deteriorates significantly. In order to avoid this state, control in which excessive transmission power is taken into consideration is performed.

Figure 5:
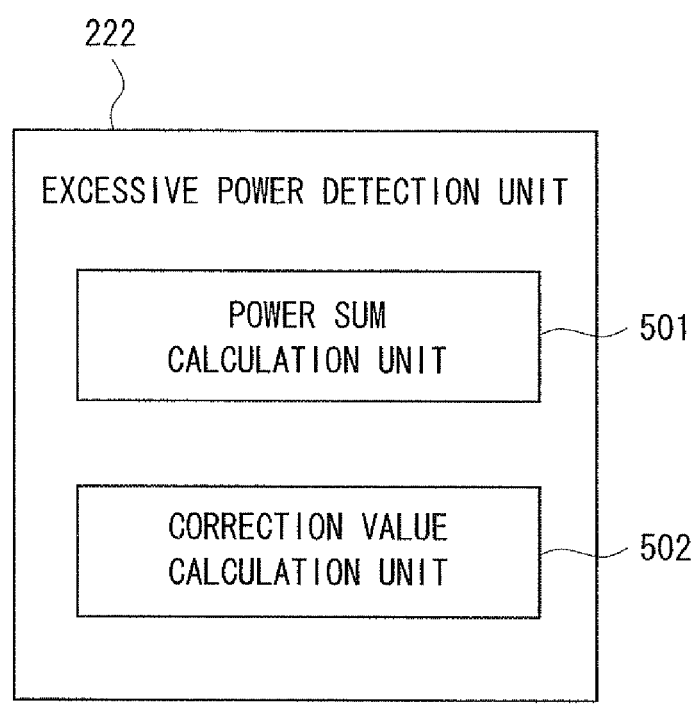
FIG. 5 shows a configuration of an excessive power detection unit according to a second exemplary embodiment of the present invention.

In the frequency mapping unit 221 shown in FIG. 2, a weight for a user for which transmission is to be performed is determined for each frequency band. After that, the total power over the entire bandwidth is calculated in the excessive power detection unit 222. FIG. 5 shows a detailed configuration of the excessive power detection unit 222.

The excessive power detection unit 222 includes a power sum calculation unit 501 and a correction value calculation unit 502. The power sum calculation unit 501 obtains the power sum of beam forming weights for each base station antenna. The correction value calculation unit 502 obtains a correction value for each base station antenna from a difference power between the power sum and a standard power value when the power sum exceeds the maximum permissible power value and thus becomes excessive power. Then, the beam forming weight is multiplied by the correction value obtained in the correction value calculation unit 502 in the multiplication unit 226.

By using expressions, the total power per antenna can be calculated by the below-shown expression.

$$P_{(p)} = \sum_{u}^{N_{UB}} \sum_{L}^{N_L} \sum_{m}^{N_{SB}} |w_{(u),(p),(L),(m)}|^2 P_{PDSCH,(u,L,m)} \quad \text{[Expression 7]}$$

In the expression, p represents an antenna number; NUE represents the number of users for which transmission is to be performed at that frame timing; and NL represents the number of layers to be transmitted. Note that $NL \leq 2$ is satisfied. Further, w(u),(p),(L),(m) represents a beam forming weight; NSN represents the number of sub-bands; and L represents a layer number. PPDSCH,(u,L,m) represents power allocated to a data channel called "PDSCH" and may change from one user to another. In addition, the existing sub-band area may change according to the user. Further, the number of layers may also change according to the user.

As a result of the above-described power calculation, averaging is performed in terms of the number of users and/or the frequency band. That is, there is a substantial possibility that power distribution per antenna becomes unbalanced in some sub-band in which there is one user. However, the unbalance is averaged in the case of multiple users and/or multiple sub-bands. That is, the magnitude of the excessive power is reduced. However, needless to say, it does not mean that all the antennas have the same power by performing this operation alone. Since the excessive power is determined by the above-described Expression 7, the amount of power that should be corrected next is obtained. A correction power gain is obtained as shown below.

$$g_{E \times PC,(p)} = \text{sqrt} \left\{ \frac{\sum_{u}^{N_{UE}} \sum_{L}^{N_L} \sum_{m}^{N_{SB}} \frac{1}{M_R} P_{PDSCH,(u,L,m)}}{P_{(p)}} \right\} \quad \text{[Expression 8]}$$

According to the numerator of the above-shown expression, when there is no beam forming weight, 1/MR of the total power is allocated to each of MR antennas. That is, it means that all the antennas have the same power. Further, normalization is performed with the power for each antenna of the denominator so that that power is achieved. By using the gain of the above Expression 8, the entire band is occupied by users to which service should be provided. Further, when the power of a data channel allocated to each user (=PDSCH power) is not low, it is possible to solve the excessive power problem that occurs in the prior art by the above-described gain. On the other hand, the above-shown Expression 8 is imperfect when, for example, there is a band(s) in which no user exits in the system band. That is, the normalization is performed even though the total power is small. In order to avoid the state like this, a below-shown condition for exercising power normalization is defined.

$$g_{E \times PC,(p)} = \begin{cases} 1.0 & \ldots \text{if } \underset{pc \text{ Art number}}{\text{Max}} (P_{(p)}) \leq \text{nominal power level} \\ g_{E \times PC,(p)} & \ldots \text{else} \end{cases} \quad \text{[Expression 9]}$$

The intention of this expression is not to perform any power correction (=coefficient 1.0) when the power of some antenna that becomes the maximum excessive power is equal to or less than a prescribed power. With the above-described feature, even when power fluctuations based on eigenvectors occur, the weight power normalization is performed in the minimum level since the entire power is defined with consideration given to the weight fluctuations due to the number of users and the selectivity of the frequency. As a result, it is possible to achieve excellent radio characteristics.

As explained above, in this exemplary embodiment, the antenna configuration having a correlation-present property within an antenna subset and a correlation-absent property between antenna subsets is separated into an antenna subset(s) and a correlation-absent antenna group. Then, eigenvalue decomposition or processing in conformance with eigenvalue decomposition is performed in the antenna subset(s). Further, eigenvalue decomposition or processing in conformance with eigenvalue decomposition is performed for the composite transmission channel of the correlation-absent antenna group. Further, in order to cope with excessive transmission power, the total power in which multiple users and the frequency dependence of those users are taken into consideration is obtained and a correction is performed only for the amount corresponding to the excessive power that is determined to be excessive.

According to this exemplary embodiment, since the averaging process is separated between the antenna subset and the correlation-absent antenna group, the averaging for improving the signal quality of a beam forming weight(s) becomes possible. Further, excellent beam forming weight control is implemented by preventing the attenuation of a desired signal component(s) due to the averaging over a long section and suppressing the transmission power fluctuations. As a result, it is possible to improve the reception signal quality. Further, it is possible to reduce the circuit size or the calculation amount. Further, it is possible to reduce the signal quality loss to the minimum level even when excessive power occurs due to the eigenvector dependence.

Third Exemplary Embodiment

A model in which a further contrivance is made to first eigenvalue decomposition, i.e., an acquisition of a first eigenvector is explained as a third exemplary embodiment according to the present invention. Its configuration is substantially the same as that shown in FIG. 2 except that the eigenvalue decomposition unit 215 in FIG. 2 is replaced by an antenna subset weight generation unit based on a maximum ratio.

Its working is explained hereinafter. It has been known that the calculation amount for eigenvalue decomposition increases according to the size of its matrix. Therefore, a configuration in which the use of eigenvalue decomposition is eliminated by deriving a semi-optimal weight(s) is disclosed hereinafter. Note that the explanation is made by using specific values for the sake of easier explanation. Assume that: the number (NT) of transmission antennas of a terminal is two; the total number (NR) of antennas of a base station is eight; the number (M) of antennas within an antenna subset of the base station is four; and the number (N) of imaginary correlation-absent antennas is two. Firstly, when eigenvalue decomposition is performed, a covariance matrix that serves as its input is defined as shown below.

$$R_{A,(k)} = H_{A,(K)}{}^H H_{A,(K)},$$

$$R_{B,(k)} = H_{B,(K)}{}^H H_{B,(K)} \quad \text{[Expression 10]}$$

In the expression, k represents a frequency number; A and B represent antenna subset numbers; and H represents a 2×4 complex number matrix.

Since there is no processing difference due to the difference of antenna subsets, only an antenna group A is examined hereinafter. Since the terminal station changes the transmission antenna while performing a time division, there is a time difference in transmission channels that can be measured in the base station. Further, the above expression can be decomposed as shown below by paying attention to the transmission antenna number of the terminal.

$$R_{A,(k)} = (H_{A[1\times4],(k)}{}^H H_{A[1\times4],(k)})_{time-0} + (H_{A[1\times4],(k)}{}^H H_{A[1\times4],(k)})_{time-SRSperiod} \quad \text{[Expression 11]}$$

Further, by paying careful attention to the first term of the above-shown covariance matrix, it is expressed as shown below.

$$H_{A[1\times4],(k)}^H H_{A[1\times4],(k)} = \begin{bmatrix} h_{0,0}^* \\ h_{0,1}^* \\ h_{0,2}^* \\ h_{0,3}^* \end{bmatrix} [ h_{0,0} \; h_{0,1} \; h_{0,2} \; h_{0,3} ] =$$

$$\begin{bmatrix} h_{0,0}^* h_{0,0} & h_{0,0}^* h_{0,1} & h_{0,0}^* h_{0,2} & h_{0,0}^* h_{0,3} \\ \vdots & \vdots & \vdots & \vdots \end{bmatrix} \quad \text{[Expression 12]}$$

Note that in the above expression, only the first line is expressed in the final result because attention is paid only to a case where the transmission antenna number of the terminal is zero and to its working. When attention is paid to the first line of the above expression, it can be seen that the covariance matrix is expressed by a conjugate complex multiplication of the channel elements of the 0th antenna and the channel elements of other antennas, i.e., is expressed by difference components. This examination is similarly applied to other lines. The only difference is that the base antenna number is changed.

The purpose here is to calculate an eigenvector(s) of the antenna subset. Since the above-shown covariance matrix is for the antenna subset, the rank is one because of the correlation-present property. That is, there is only one type of an eigenvector(s). That is, an eigenvector equivalent is obtained by normalizing the below-shown difference vector (=it means the magnitude as a vector, rather than each element, becomes 1.0).

$$V_{AP[4\times1],\#0}{}^H = h^*_{0,0} [h_{0,0}, h_{0,1}, h_{0,2}, h_{0,3}] \quad \text{[Expression 13]}$$

In the expression, the superscript H represents a Hermitian transpose operator. However, the above-described conclusion holds when the number of terminal transmission antennas is only one. When the number of terminal transmission antennas is two or larger, a further operation(s) is necessary. This is because a transmission channel that arrives at each reception antenna from a second terminal transmission antenna is different from a transmission channel that arrives from the above-described first terminal transmission antenna.

The below-shown vector is obtained for the second terminal transmission antenna by performing a similar process(s) to that for the first terminal transmission antenna.

$$V_{AP[4\times1],\#1}{}^H = h^*_{1,0} [h_{1,0}, h_{1,1}, h_{1,2}, h_{1,3}] \quad \text{[Expression 14]}$$

In this exemplary embodiment, an eigenvector equivalent is obtained without performing eigenvalue decomposition by performing a maximum ratio combination of these two vectors. That is, the final weight of the antenna subset is expressed as shown below.

$$V_{AP[4\times1]} = \text{Normalize}\{\|V_{AP[4\times1],\#0}\|V_{AP[4\times1],\#0} + \|V_{AP[4\times1],\#1}\|V_{AP[4\times1],\#1}\} \quad \text{[Expression 15]}$$

In the expression, ||V|| represents a power level of a vector.

By using this expression, for the vector (VAP[4×1], #0) for which a difference is obtained by transmission channel elements of the 0th reception antenna for the transmission channel that is obtained from the 0th terminal antenna and the vector (VAP[4×1], #1) for which a difference is obtained by transmission channel elements of the 0th reception antenna for the transmission channel that is obtained from the first terminal antenna, a weight is given to the vector having a larger vector level and then the vectors are combined. As a result, larger power is obtained as a unified vector (=an eigenvalue equivalent is obtained). By using this method, it is possible to obtain a semi-optima antenna subset weight based on a maximum ration combination without performing any eigenvalue decomposition by spending an enormous calculation cost.

Fourth Exemplary Embodiment

In this exemplary embodiment, a further contrivance is made to second eigenvalue decomposition, i.e., an acquisition of an eigenvector for a composite channel. Its configuration is substantially the same as that shown in FIG. 2 except that the eigenvalue decomposition unit 220 in FIG. 2 is replaced by a weight generation unit based on a maximum ratio.

Its working is explained hereinafter. As described previously, it has been known that the calculation amount for eigenvalue decomposition increases according to the size of its matrix. In general, the matrix size of an antenna subset is large. However, because of its correlation-present property, there is no need to perform eigenvalue decomposition for each sub-band. That is, although the calculation amount is large, the calculation amount does not necessarily become the largest calculation amount as a whole because the number of times of the performances is small.

Meanwhile, this exemplary embodiment copes with an operation(s) for each sub-band. Even if the matrix size is small, if the number of times of eigenvalue decomposition operations becomes larger, there are cases where the second eigenvalue decomposition that is performed for each sub-band size becomes dominant in terms of the substantial calculation cost.

Therefore, a configuration in which the use of second eigenvalue decomposition is eliminated by deriving a semi-optimal weight(s) is disclosed hereinafter. As a general idea, attention is paid to bringing element vectors of a composite channel into an in-phase state. Note that the rank of the covariance matrix to be applied to an antenna subset used in the eigenvalue decomposition for an antenna subset describe above is one. In contrast to this, the maximum rank of the covariance matrix to be applied to a composite channel is two (it is determined to the smaller one of the number of terminal antennas and the number of antenna subsets of the base station). Therefore, it is impossible to apply the above-described technique for simplifying eigenvalue decomposition for an antenna subset to a composite channel without making any modification.

The explanation is made hereinafter by using expressions. Although a composite channel is defined as shown as Expression 2 in the second exemplary embodiment, second eigenvalue decomposition is performed in order to obtain an optimal weight(s) suitable for the above-described composite channel in this exemplary embodiment. For example, when a weight for a composite channel is defined as shown below, the beam forming weight that is eventually obtained is expressed as [αVAP βVBP].

$$W_{tmp} = [\alpha \beta]^T \qquad \text{[Expression 16]}$$

In the above expression, the vector normalization processing is omitted for clarifying the process flow. Note that each of α and β is a complex number and a relation "$|\alpha|^2 + |\beta|^2 = 1$" is satisfied.

While eigenvalue decomposition is performed in order to obtain an optimal Wtmp in the second exemplary embodiment, different processing is performed in order to reduce the processing amount in this exemplary embodiment. From Expressions 2 and 16, a transmission channel observed in a terminal station is expressed as shown below.

$$H_{tmp}W_{tmp} = \begin{bmatrix} h_{a0} & h_{b0} \\ h_{a1} & h_{b1} \end{bmatrix} \begin{bmatrix} \alpha \\ \beta \end{bmatrix} = \begin{bmatrix} h_{a0}\alpha + h_{b0}\beta \\ h_{a1}\alpha + h_{b1}\beta \end{bmatrix} \qquad \text{[Expression 17]}$$

In order to maximize Expression 17 (=a transmission channel observed in the terminal station is maximized), the amplitudes and the phases of α and β are adjusted. If the first line in Expression 17 is to be maximized, the maximization can be performed by defining as "α=ha0*" and "β=hb0*".

However, what can be achieved by this operation is only to maximize the 0th reception antenna of the terminal station. That is, this operation may not be able to maximize the first reception antenna of the terminal station. Although the second exemplary embodiment uses eigenvalue decomposition by spending a calculation cost in order to optimize this problem, the below-shown maximum ratio combination processing is performed in this exemplary embodiment.

$$\begin{bmatrix} \alpha^1 \\ \beta^1 \end{bmatrix} = \begin{bmatrix} |h_{a0}|^2 h_{a0}^* + |h_{a1}|^2 h_{a1}^* \\ |h_{b0}|^2 h_{b0}^* + |h_{b1}|^2 h_{b1}^* \end{bmatrix} \qquad \text{[Expression 18]}$$

The intention of this expression is to perform a weighting combination, with a complex coefficient corresponding to the 0th reception antenna of the terminal and a complex coefficient corresponding to the first reception antenna, between the respective antenna subsets. The below-shown final weight for a composite transmission channel is obtained by performing normalization for this result.

$$\begin{bmatrix} \alpha \\ \beta \end{bmatrix} = \frac{1}{\sqrt{|\alpha^1|^2 + |\beta^1|^2}} \begin{bmatrix} \alpha^1 \\ \beta^1 \end{bmatrix} \qquad \text{[Expression 19]}$$

By expressing this weight as [αVAP βVBP], the final beam forming weight is obtained. As explained above, according to this exemplary embodiment, a beam forming weight is obtained by a maximum ratio combination without using the eigenvalue decomposition unit 220 like the one used in the second exemplary embodiment. Further, as another embodiment, it is possible to perform maximum value select processing instead of the maximum ratio combination processing shown by Expression 18. Although the characteristics are not as good as those in the maximum ratio combination, the maximum value select processing is effective in terms of the reduction in the calculation amount.

Other Exemplary Embodiments

Although its applications are described above as second to fourth exemplary embodiments in regard to a simple TDD system, it is necessary to make some considerations when it is applied to a FDD system. Firstly, in the FDD, the center RF frequency is different between the uplink and the down link. Therefore, the definition of the antenna interval 0.5λ (half wavelength) within an antenna subset is changed depending on which frequency/wavelength is regarded as the reference frequency/wavelength. Therefore, it is necessary to make a correction with consideration given to the optical path difference due to the frequency difference. Further, since the frequency is different between the transmission and the reception in the FDD, it is conceivable that the estimation accuracy for transmission channel fluctuations in a composite channel deteriorates. In such cases, it is conceivable to use, for example, a method for intentionally changing the control phase for a composite channel within a sub-band.

Specifically, by using a phase for a composite channel that is obtained in a given sub-band as a reference phase, it is changed by 360 degrees within a sub-band. In this way, at least some phase is always optimized although the optimal phase is not necessarily achieved at all times, thus making it possible to ensure the minimum quality. Note that since a weight within an antenna subset indicates, roughly speaking, a direction component of a terminal, the idea of the present invention can be also applied in the FDD by performing a correction for an error(s) caused by the wavelength of the above-described up/down frequency.

Other Exemplary Embodiments

Although exemplary embodiments according to the present invention have been described above in a detailed manner, any system or apparatus in which different features included in respective exemplary embodiments are combined in any possible manner is also included in the scope of the present invention.

Further, the present invention may be applied to a system composed of a plurality of apparatuses or may be applied to a single apparatus. Further, the present invention can be also applied to a case where an information processing program for implementing a function(s) of an exemplary embodiment is directly or remotely supplied to a system or an apparatus. Therefore, a program that is installed into a computer in order to implement a function(s) according to the present invention by using the computer, a medium storing that program, or a WWW (World Wide Web) server that enables that program to be downloaded is also included in the scope of the present invention.

Although the present invention is described as a hardware configuration in the above-described exemplary embodiments, the present invention is not limited to the hardware configurations. In the present invention, arbitrary processing can be also implemented by causing a CPU (Central Processing Unit) to execute a computer program.

The above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention is explained above with reference to exemplary embodiments, the present invention is not limited to the description above. Various modifications that can be understood by those skilled in the art can be made to the configuration and details of the present invention within the scope of the invention.

This application is based upon and claims the benefit of priority from Japanese patent application No. 2011-014974, filed on Jan. 27, 2011, the disclosure of which is incorporated herein in its entirety by reference.

Other Expressions of Exemplary Embodiments

The whole or part of the exemplary embodiments disclosed above can be described as, but not limited to, the following supplementary notes.
(Supplementary Note 1)

An information processing apparatus including N antenna subsets (N is a natural number no less than two) each including M antennas (M is a natural number no less than two) and thereby including NR base station antennas in total (note that NR=M×N), further including:

transmission channel estimation means for performing transmission channel estimation for NT×NR reception signals (NT is a natural number no less than one) and thereby outputting NT×NR estimated transmission channel values, the NT×NR reception signals being output by NT terminal antennas of a user terminal and received by the base station antennas;

first covariance matrix generation means for dividing the estimated transmission channel values into N groups of NT×M estimated transmission channel values and obtaining a covariance matrix with M rows and N columns for each of the estimated transmission channel value groups;

first averaging means for averaging each of the N covariance matrixes generated in the first covariance matrix generation means over a predetermined range in terms of at least a time or a frequency;

first eigenvector generation means for generating eigenvectors or eigenvector equivalents based on respective N outputs from the first averaging means;

composite channel generation means for generating transmission channels between the base station antennas and the terminal antennas from respective N eigenvectors or eigenvector equivalents and the estimated transmission channel values;

second covariance matrix generation means for obtaining covariance matrixes for composite transmission channels generated by the composite channel generation means;

second averaging means for averaging covariance matrixes generated by the second covariance matrix generation means over a different range from the range used in the first averaging means;

second eigenvector generation means for outputting at least one eigenvector or eigenvector equivalent based on each of N outputs from the second averaging means; and combination means for combining eigenvectors or eigenvector equivalents generated by the first and second eigenvector generation means and thereby obtaining a beam forming weight.
(Supplementary Note 2)

The information processing apparatus described in Supplementary note 1, in which the first eigenvector generation means performs eigenvalue decomposition on each of N outputs of the first averaging means and thereby outputs N first eigenvectors each including M elements.
(Supplementary Note 3)

The information processing apparatus described in Supplementary note 1 or 2, in which the second eigenvector generation means performs eigenvalue decomposition for an output of the second averaging means and thereby outputs at least one second eigenvector.

(Supplementary Note 4)

The information processing apparatus described in Supplementary note 1, in which the first eigenvector generation means obtains NT inter-antenna difference vectors each including M components and generates the eigenvector equivalent by performing a maximum ratio combination on the NT inter-antenna difference vectors, the NT inter-antenna difference vector including the M elements corresponding to components of a given row of a covariance matrix.

(Supplementary Note 5)

The information processing apparatus described in any one of Supplementary notes 1 to 4, in which the second eigenvector generation means outputs a weight as the eigenvector equivalent, the weight being obtained by controlling a combination ratio of N elements by a maximum ratio or maximum value selection with consideration given to a weight of each element of a composite transmission channel matrix so that a composite transmission channel to be received by the user terminal becomes larger.

(Supplementary Note 6)

The information processing apparatus described in any one of Supplementary notes 1 to 5, further including:

power sum calculation means for obtaining a power sum of the beam forming weight output from the combination means for each base station antenna;

correction value calculation means for obtaining, when the power sum exceeds a maximum permissible power value and thus becomes excessive power, a correction value for each of the base station antennas from a difference power between the power sum and a standard power value: and multiplication means for multiplying the beam forming weight by a correction value obtained by the correction value calculation means.

(Supplementary Note 7)

An information processing method including:

a transmission channel estimation step of performing transmission channel estimation for reception signals received by NR base station antennas including N antenna subsets (N is a natural number no less than two) each including M antennas (M is a natural number no less than two) (note that NR=M×N), and thereby outputting estimated transmission channel values;

a first covariance matrix generation step of dividing the estimated transmission channel values into N groups and obtaining a covariance matrix with M rows and N columns for each of the estimated transmission channel value groups;

a first averaging step of averaging each of the generated covariance matrixes over a predetermined range in terms of at least a time or a frequency;

a first eigenvector generation step of generating eigenvectors or eigenvector equivalents based on respective N outputs obtained in the first averaging step;

a composite channel generation step of generating transmission channels between the base station antennas and terminal antennas from respective N eigenvectors or eigenvector equivalents and the estimated transmission channel values;

a second covariance matrix generation step of obtaining covariance matrixes for composite transmission channels generated in the composite channel generation step;

a second averaging step of averaging covariance matrixes generated in the second covariance matrix generation step over a different range from the range used in the first averaging step;

a second eigenvector generation step of outputting at least one eigenvector or eigenvector equivalent based on each of N average values derived in the second averaging step; and a combination step of combining eigenvectors or eigenvector equivalents generated in the first and second eigenvector generation steps and thereby obtains a beam forming weight.

(Supplementary Note 8)

A non-transitory computer readable medium storing an information processing program that causes a computer to execute:

a transmission channel estimation step of performing transmission channel estimation for reception signals received by NR base station antennas including N antenna subsets (N is a natural number no less than two) each including M antennas (M is a natural number no less than two) (note that NR=M×N), and thereby outputting estimated transmission channel values;

a first covariance matrix generation step of dividing the estimated transmission channel values into N groups and obtaining a covariance matrix with M rows and N columns for each of the estimated transmission channel value groups;

a first averaging step of averaging each of the generated covariance matrixes over a predetermined range in terms of at least a time or a frequency;

a first eigenvector generation step of generating eigenvectors or eigenvector equivalents based on respective N outputs obtained in the first averaging step;

a composite channel generation step of generating transmission channels between the base station antennas and terminal antennas from respective N eigenvectors or eigenvector equivalents and the estimated transmission channel values;

a second covariance matrix generation step of obtaining covariance matrixes for composite transmission channels generated in the composite channel generation step;

a second averaging step of averaging covariance matrixes generated in the second covariance matrix generation step over a different range from the range used in the first averaging step;

a second eigenvector generation step of outputting at least one eigenvector or eigenvector equivalent based on each of N average values derived in the second averaging step; and a combination step of combining eigenvectors or eigenvector equivalents generated in the first and second eigenvector generation steps and thereby obtains a beam forming weight.

REFERENCE SIGNS LIST

201 BEAM FORMING WEIGHT GENERATION UNIT
202 POWER ADJUSTMENT UNIT
203 TRANSMISSION DATA GENERATION UNIT
204 DATA CHANNEL GENERATION UNIT
212 TRANSMISSION CHANNEL ESTIMATION UNIT
213 COVARIANCE MATRIX GENERATION UNIT (CORRELATION-PRESENT CHANNEL COVARIANCE MATRIX GENERATION UNIT)
214 AVERAGING UNIT (FOR CORRELATION-PRESENT CHANNEL COVARIANCE MATRIX)
215 EIGENVALUE DECOMPOSITION UNIT (M×M)
216 COMPLEX NUMBER MULTIPLICATION UNIT
217 COMPOSITE CHANNEL GENERATION UNIT
218 COVARIANCE MATRIX GENERATION UNIT (FOR COMPOSITE CHANNEL)
219 AVERAGING UNIT (FOR COMPOSITE CHANNEL COVARIANCE MATRIX)
220 EIGENVALUE DECOMPOSITION UNIT (N×N)
221 FREQUENCY MAPPING UNIT
222 EXCESSIVE POWER DETECTION UNIT
235 IFFT UNIT

The invention claimed is:

1. An information processing apparatus comprises N antenna subsets (N is a natural number no less than two) each comprising M antennas (M is a natural number no less than two) and thereby comprising NR base station antennas in total (note that NR=M×N), and the information processing apparatus further comprises:
   a transmission channel estimation unit that performs transmission channel estimation for NT×NR reception signals (NT is a natural number no less than one) and thereby outputs NT×NR estimated transmission channel values, the NT×NR reception signals being output by NT terminal antennas of a user terminal and received by the base station antennas;
   a first covariance matrix generation unit that divides the estimated transmission channel values into N groups of NT×M estimated transmission channel values and obtains a respective covariance matrix with M rows and N columns for each of the estimated transmission channel value groups;
   a first averaging unit that averages each of the N respective covariance matrixes generated in the first covariance matrix generation unit over a predetermined range in terms of at least a time or a frequency;
   a first eigenvector generation unit that generates N first eigenvectors or first eigenvector equivalents based on respective N outputs from the first averaging unit;
   a composite channel generation unit that generates respective composite transmission channels between the NR base station antennas and the NT terminal antennas from respective N first eigenvectors or first eigenvector equivalents and the estimated transmission channel values;
   a second covariance matrix generation unit that obtains second covariance matrixes for the respective composite transmission channels generated by the composite channel generation unit;
   a second averaging unit that averages second covariance matrixes generated by the second covariance matrix generation unit over a different range from the predetermined range used in the first averaging unit;
   a second eigenvector generation unit that outputs at least one of second eigenvector or second eigenvector equivalent based on each of N outputs from the second averaging unit; and
   a combination unit that combines the N first eigenvectors or the first eigenvector equivalents generated by the first eigenvector generation unit and the at least one of the second eigenvector or the second eigenvector equivalent generated by the second eigenvector generation unit and thereby obtains a beam forming weight.

2. The information processing apparatus according to claim 1, wherein the first eigenvector generation unit performs first eigenvalue decomposition on each of N outputs of the first averaging unit and thereby outputs the N first eigenvectors each comprising M elements.

3. The information processing apparatus according to claim 1, wherein the second eigenvector generation unit performs second eigenvalue decomposition for an output of the second averaging unit and thereby outputs the at least one of the second eigenvector.

4. The information processing apparatus according to claim 1, wherein the first eigenvector generation unit obtains NT inter-antenna difference vectors each comprising M components and generates the first eigenvector equivalent by performing a maximum ratio combination on the NT inter-antenna difference vectors, the NT inter-antenna difference vector including M elements corresponding to the M components of a given row of a third covariance matrix.

5. The information processing apparatus according to claim 1, wherein the second eigenvector generation unit outputs a weight as the second eigenvector equivalent, the weight being obtained by controlling a combination ratio of N elements by a maximum ratio or maximum value selection with consideration given to the weight of each element of a composite transmission channel matrix so that the respective composite transmission channel to be received by the user terminal becomes larger.

6. The information processing apparatus according to claim 1, further comprising:
   a power sum calculation unit that obtains a power sum of the beam forming weight output from the combination unit for each base station antenna;
   a correction value calculation unit that obtains, when the power sum exceeds a maximum permissible power value and thus becomes excessive power, a correction value for each of the base station antennas from a difference power between the power sum and a standard power value: and
   a multiplication unit that multiplies the beam forming weight by a correction value obtained by the correction value calculation unit.

7. An information processing method comprising:
   a transmission channel estimation step of performing transmission channel estimation for reception signals received by NR base station antennas comprising N antenna subsets (N is a natural number no less than two) each comprising M antennas (M is a natural number no less than two) (note that NR=M×N), and thereby outputting estimated transmission channel values;
   a first covariance matrix generation step of dividing the estimated transmission channel values into N groups and obtaining a respective first covariance matrix with M rows and N columns for each of the estimated transmission channel value groups;
   a first averaging step of averaging each of the generated first covariance matrixes over a predetermined range in terms of at least a time or a frequency;
   a first eigenvector generation step of generating N first eigenvectors or first eigenvector equivalents based on respective N outputs obtained in the first averaging step;
   a composite channel generation step of generating respective composite transmission channels between the base station antennas and terminal antennas from the respective N first eigenvectors or the first eigenvector equivalents and the estimated transmission channel values;
   a second covariance matrix generation step of obtaining second covariance matrixes for the respective composite transmission channels generated in the composite channel generation step;
   a second averaging step of averaging the second covariance matrixes generated in the second covariance matrix generation step over a different range from the predetermined range used in the first averaging step;
   a second eigenvector generation step of outputting at least one of second eigenvector or second eigenvector equivalent based on each of N average values derived in the second averaging step; and
   a combination step of combining the N first eigenvectors or the first eigenvector equivalents generated in the first eigenvector generation step and the at least one of the second eigenvector or the second eigenvector equivalent generated in the second eigenvector generation step and thereby obtains a beam forming weight.

8. A non-transitory computer readable medium storing an information processing program that causes a computer to execute:
- a transmission channel estimation step of performing transmission channel estimation for reception signals received by NR base station antennas comprising N antenna subsets (N is a natural number no less than two) each comprising M antennas (M is a natural number no less than two) (note that NR=M×N), and thereby outputting estimated transmission channel values;
- a first covariance matrix generation step of dividing the estimated transmission channel values into N groups and obtaining a respective first covariance matrix with M rows and N columns for each of the estimated transmission channel value groups;
- a first averaging step of averaging each of the generated first covariance matrixes over a predetermined range in terms of at least a time or a frequency;
- a first eigenvector generation step of generating N first eigenvectors or first eigenvector equivalents based on respective N outputs obtained in the first averaging step;
- a composite channel generation step of generating respective composite transmission channels between the base station antennas and terminal antennas from the respective N first eigenvectors or the first eigenvector equivalents and the estimated transmission channel values;
- a second covariance matrix generation step of obtaining second covariance matrixes for the respective composite transmission channels generated in the composite channel generation step;
- a second averaging step of averaging the second covariance matrixes generated in the second covariance matrix generation step over a different range from the predetermined range used in the first averaging step;
- a second eigenvector generation step of outputting at least one of second eigenvector or second eigenvector equivalent based on each of N average values derived in the second averaging step; and
- a combination step of combining the N first eigenvectors or the first eigenvector equivalents generated in the first eigenvector generation step and the at least one of the second eigenvector or the second eigenvector equivalent generated in the second eigenvector generation step and thereby obtains a beam forming weight.

* * * * *